United States Patent Office 3,390,092
Patented June 25, 1968

3,390,092
DISHWASHING DETERGENT PREPARATIONS CONTAINING SODIUM OR POTASSIUM DICHLOROISOCYANURATE
Russell R. Keast, Yardley, Pa., and Duncan S. Corliss, Roselle, N.J., assignors to FMC Corporation, New York, N.Y., a corporation of Delaware
No Drawing. Filed Mar. 30, 1965, Ser. No. 444,063
9 Claims. (Cl. 252—99)

ABSTRACT OF THE DISCLOSURE

Dishwashing tablets and granular preparations are formulated to contain a dichloroisocyanurate, white paraffin oil, a low-foaming nonionic surfactant, sodium silicate, a polyphosphate and a filler.

---

This invention relates to detergent preparations containing chlorinated isocyanurates designed for use in dishwashing machines.

Dishwashing formulations must, in addition to good performance in use, have good (a) storage stability, (b) defoaming power, (c) dissolving rate, (d) cleaning power, and (e) water-softening properties. They must also be non-corrosive to the metal parts of the dishwasher.

By "storage stability" is meant the property of not losing excessive amounts of active chlorine from the chlorinated isocyanurate component of the cleaner. Since the chlorinated isocyanurate tends to lose chlorine in the presence of surfactants frequently used to give the desired cleansing power, this property of adequate storage stability presents a difficult problem.

Preparations which foam readily are objectionable for use in automatic dishwashing machines because the foam formed limits the impact of the cleansers on the dirty or greasy dishes. Moreover, most dishwashers are not designed to accommodate appreciable foam and will froth over, with possible damage to the machine.

There is a need and a demand for low-foaming or non-foaming dishwashing preparations having good storage stability, dissolving rate and good cleansing power, and which are not corrosive to the metal parts of automatic dishwashers.

It is a principal object of our invention to provide a dishwashing preparation which fills the aforesaid need and demand.

Another object of our invention is to provide a tablet eminently satisfactory for use in automatic dishwashers having all of the above-noted desired properties of dishwashing detergents.

Other objects and advantages of our invention will be apparent from the following detailed description thereof. In this specification all percentages and parts are given on a weight basis.

The dishwashing preparation of our invention contains as its essential constituents:

(1) Sodium and/or potassium dichloroisocyanurate—from about 2% to about 5%, preferably about 3% to about 4%
(2) White paraffin oil—from about 0.5% to about 3.0%, preferably about 1.0% to about 1.5%
(3) Low-foaming nonionic surfactant having the properties of defoaming food soils and compatibility with chlorinated isocyanurates—from about 0.5% to about 3%, preferably about 1.0% to about 1.5%
(4) A sodium silicate having an $Na_2O$ to $SiO_2$ ratio of about 1:3.25 to 2:1 and a water content of about 0 to 20%—from about 20% to about 40%, preferably about 25% to about 30%
(5) Polyphosphates having an $Na_2O$ or $K_2O$ to $P_2O_5$ ratio of about 1:1 to 2:1—from about 25% to about 55%, preferably about 50%
(6) Filler, usually soda ash, sodium chloride or sodium sulfate, or mixtures of two or more of these components—essentially the rest, usually from about 10% to about 50%

In the case of a tablet, the formulations contain a seventh component, namely from about 0.1% to about 1% of tableting binder, usually about 0.5%.

The solution resulting from the addition of the preparation to water has a pH of from about 10.5 to about 12.2 at 1% concentration.

The first five constituents noted above are necessary and cooperate to give the unique combination of desirable properties possessed by the dishwashing preparations of the invention. In use in the aqueous medium to which the preparation is added to effect cleaning of the dishes in the dishwasher, the sodium or potassium dichloroisocyanurate component of the preparation provides active chlorine which, as is well known, is an excellent sanitizer and germicide and aids in the cleansing action. The sodium or potassium dichloroisocyanurate used can be the commercially available product which is sold in crystal or granular form. The particle size of the granules or crystals of the sodium or potassium dichloroisocyanurate is not critical; any available particle size can be used.

The white paraffin oil component improves the stability of the product from the standpoint of minimizing loss of chlorine while the preparation is in the solid phase, e.g., in storage. White paraffin oil of commerce, such, for example, as "Bayol–55" can be used. The white paraffin oil used boils within the range of from about 400° to about 930° F., desirably its initial boiling point is about 460° F. Refined kerosene fractions of commerce can be used.

The nonionic surfactant component results in a preparation high in food soil defoaming power, i.e., a preparation which has little or no tendency to foam by itself or in the presence of a foam-producing food soil. The nonionic surfactant employed must have a combination of three properties: (1) it must be a low-foaming material, (2) it must be capable of defoaming food soils such as milk, and (3) it must be compatible with chlorinated isocyanurates, that is, it must not decompose these chlorinated compounds markedly in the formulation.

Nonionic surfactants which meet these requirements include the lower alkyl ethers of polyoxyethylated octylphenols such as, for example "Triton CF–54," which is the butyl ether of polyoxyethylated octylphenol; polyoxyalkylene glycols having a plurality of alternating hydrophobic and hydrophilic polyoxyalkylene chains, the hydrophilic chains consisting of linked oxyethylene radicals and the hydrophobic chains consisting of linked oxypropylene radicals, said product having three hydrophobic chains linked by two hydrophilic chains, the central hydrophobic chain constituting 30% to 34% by weight of the product, the terminal hydrophobic chains together constituting 31% to 39% by weight of the product, the linking hydrophilic chains together constituting 31% to 35% by weight of the product, the intrinsic viscosity of the product being from about 0.06 to 0.09 and the molecular weight of the product being from about 3000 to 5000, all as described in U.S. Patent 3,048,548; the alkyl polyoxyalkylene ether alcohols based on straight chain biodegradable hydrophobic segments, for example Petrolite H–0307–S; and, the water soluble benzyl ether of octylphenol condensed with ethylene oxide.

Other nonionic surfactants are suitable for use in the herein dishwashing preparations and it is not intended to exclude any surfactant possessing the above properties. Omission of the surfactant results in a formulation which lacks the ability to suppress the foam produced by food soils.

Sodium silicates of commerce having particles sizes of from 230 to 2000 microns are used in the production of granular preparations. Such particle size sodium silicates or fines can be used in the production of tablets. The incorporation of fines, i.e. material having a particle size of 74 microns or less, or such that substantially all of the material passes through a 200 mesh sieve (United States Standard Series), should not be used in the preparation of the granular product because such sodium silicate fines tend to produce an unstable product from the standpoint of loss of available chlorine on storage. Surprisingly, we have found that in the production of a tablet, the use of sodium silicate fines, i.e., having an average particle size of 74 microns or less, results in a product of markedly improved stability as compared with a similar tablet in which anhydrous sodium silicate granules are used.

Sodium silicates useful in the herein preparations are those having an $Na_2O$ to $SiO_2$ ratio of about 1:3.25 to 2:1, and containing about 0 to 20% of water. Typical silicates falling within this definition are anhydrous sodium metasilicate, which is preferred for use herein; GD Silicate which is a product having an $Na_2O$ to $SiO_2$ ratio of 1:2 and typically available at a water content of 18.5%; and, G Silicate which has an $Na_2O$ to $SiO_2$ ratio of 1:3.22 and frequently containing 18.5% of water.

The sodium silicate in the preparation serves as a detergent builder, i.e. enhances the cleansing action, and results in a preparation which when dissolved produces a solution having a pH which is more alkaline than would be the case if the sodium silicate were not employed. As is well known, the more alkaline the solution, the better the cleansing action, as a general rule. Also the sodium silicate acts as a corrosion inhibitor for metal parts of the dishwashing machine.

The polyphosphate functions as a water softener and a detergent builder. Polyphosphates of commerce, and having an $Na_2O$ or $K_2O$ to $P_2O_5$ ratio of about 1:1 to 2:1 can be used. Typical polyphosphates of this kind are the preferred sodium tripolyphosphate, sodium hexametaphosphate and sodium pyrophosphate, as well as the corresponding potassium polyphosphates. The particle size of the polyphosphate is not critical. Any of the finely divided products readily available can be employed.

Soda ash filler, which can be the soda ash of commerce in any available finely divided form, when used, aids in the formation of an alkaline solution when the preparation is dissolved in water. Its presence is responsible for a more alkaline solution upon dissolution of the preparation in water than would be otherwise formed. The added alkalinity gives better cleansing and also tends to insure that the preparation when dissolved in water is substantially noncorrosive to the metal parts of the dishwashing machine.

Any of the tableting binders of commerce which are inert in the herein system can be used in the formation of tablets. These binders are added to give a strong tablet, one which will not disintegrate in storage. Desirably the tableting binder used has lubricating properties so that its incorporation results in diminished wear of the dies of the tableting machine. A preferred binder is "Sterotex" which is a powdered vegetable fat.

In the preparation of the product of this invention the sodium silicate, nonionic surfactant, white paraffin oil, filler, e.g., soda ash or sodium chloride, polyphosphate and the tableting binder, if used, are blended in the order mentioned in any suitable mixing mill. After the formation of a uniform blend of these components, the sodium or potassium dichloroisocyanurate is added to this blend and uniformly distributed therethroughout. A mixture of sodium and potassium dichloroisocyanurates can be used, if desired. This blending procedure minimizes contact of the sodium and/or potassium dichloroisocyanurate with the nonionic surfactant during the blending, with consequent improved stability of the product.

The presence of the white oil in the formulation is of particular importance in that it minimizes any decomposition of the dichloroisocyanurate which might occur in the formulation.

When forming tablets, the blended mixture prepared as hereinabove described is tableted in any available tableting machine under tableting pressures of from 1000 to 15,000 pounds. Tablets of any desired size and shape can be produced, desirably disc-like tablets having, for example, a weight of about 12 grams each, a diameter of 30 mm. and a thickness of 12 mm.

The following examples of this invention are given for illustrative purposes. It will be understood the invention is not limited to these examples.

EXAMPLE 1.—TABLET

| Component: | Percent |
| --- | --- |
| Sodium dichloroisocyanurate | 4.2 |
| White paraffin oil | 0.8 |
| "Triton CF–54" | 1.7 |
| Anhydrous sodium metasilicate | 30.0 |
| Sodium tripolyphosphate | 50.0 |
| Soda ash | 12.8 |
| Tableting binder ("Sterotex") | 0.5 |
| | 100.00 |

EXAMPLE 2.—TABLET

| Component: | Percent |
| --- | --- |
| Sodium dichloroisocyanurate | 4.20 |
| White paraffin oil | 1.67 |
| "Triton CF–54" | 0.83 |
| Anhydrous sodium metasilicate | 30.00 |
| Sodium tripolyphosphate | 50.00 |
| Soda ash | 12.80 |
| Tableting binder ("Sterotex") | 0.50 |
| | 100.00 |

EXAMPLE 3.—TABLET

| Component: | Percent |
| --- | --- |
| Potassium dichloroisocyanurate | 3.6 |
| White paraffin oil | 0.8 |
| "Triton CF–54" | 0.6 |
| Anhydrous sodium metasilicate | 25.4 |
| Sodium tripolyphosphate | 45.0 |
| Soda ash | 17.1 |
| Sodium chloride | 7.5 |
| | 100.00 |

These constituents were blended in the following order, namely, the sodium metasilicate was first introduced into the mixer, then the surfactant, then the white paraffin oil ("Bayol 55"), thereafter the soda ash, and the sodium chloride in the case of Example 3, thereafter the sodium tripolyphosphate, then the tableting binder ("Sterotex"), and finally the sodium dichloroisocyanurate in Examples 1 and 2 and the potassium dichloroisocyanurate in Example 3, with blending of the respective constituents as added before the next constituent, in the order mentioned, is introduced into the mixer. The blended mixture was pressed at 2000 pounds in a Carver laboratory press to form the tablets.

EXAMPLE 4.—GRANULAR PREPARATION

| Component: | Percent |
| --- | --- |
| Sodium dichloroisocyanurate | 2.5 |
| White paraffin oil | 0.5 |
| "Triton CF–54" | 1.0 |
| Anhydrous sodium metasilicate | 25.0 |
| Sodium tripolyphosphate | 30.0 |
| Soda ash | 41.0 |
| | 100.00 |

EXAMPLE 5.—GRANULAR PREPARATION

| Component: | Percent |
|---|---|
| Sodium dichloroisocyanurate | 2.5 |
| White paraffin oil | 1.0 |
| "Triton CF-54" | 0.5 |
| Anhydrous sodium metasilicate | 25.0 |
| Sodium tripolyphosphate | 30.0 |
| Soda ash | 41.0 |
| | 100.00 |

This granular preparation was made by blending the components in the same order as mentioned above with particular reference to Example 1, except, of course, that the tableting binder was not used.

Specimens of the examples were tested to determine the percent loss of available chlorine after storage for three weeks under "accelerated" storage conditions, namely the tablets and the granular preparations were stored in 250 ml. wide-mouth Erlenmeyer flasks which were covered with a taped-on piece of paper-polyethylene laminate, and these permeable flasks were then placed in an oven maintained at a temperature of 100° ± 2° F. and 80° ± 5% relative humidity for three weeks. Thereafter they were removed and the tests performed on these preparations to determine the percent loss of available chlorine and also the defoaming properties. Tests were also carried out on the preparations before storage to determine their defoaming properties as well as tests on the preparations both before and after storage in an automatic dishwashing machine to determine performance and the rate of dissolution.

The tests to determine the percent loss of available chlorine followed the standard procedure of analyzing iodometrically the tablet or granular preparation under test for residual available chlorine and calculating from this data the percent loss of available chlorine.

The defoaming powers of the preparations, both in tablet and granular form, were determined as follows.

Each sample under test was dissolved in 1000 ml. of distilled water. When testing a tablet, 78 ml. of the resultant solution was diluted to 250 ml. with distilled water, yielding a 0.375% solution which is the concentration usually found in a dishwasher. When testing the granular preparation, 47 ml. of the solution was diluted to 250 ml. with distilled water to produce 0.375% solution. These solutions were warmed to 140° F. and placed in a one-quart, two speed Waring Blendor which was run at high speed for two minutes. One minute after stopping the Waring Blendor, the foam height in centimeters above the liquid level was measured. 0.35 gram of dried milk solids was then added and the procedure repeated, and the foam height remeasured.

For comparative purposes the above tests were carried out on formulations hereinbelow identified which differed from the preparations embodying this invention in that the preparation did not contain both the nonionic surfactant and the white paraffin oil, but contained one or the other of these constituents.

The tablet of Example 1, when tested as hereinabove described, showed a percent loss of available chlorine after three weeks of storage under the "accelerated" conditions of 52%. The comparative test on a tablet which contained 2.5% of the same nonionic surfactant ("Triton CF-54") but no white paraffin oil, the amount of nonionic surfactant being equal to the combined amounts of nonionic surfactant and white paraffin oil in the tablet of Example 1, showed a percent loss of available chlorine after three weeks of storage of 95%. Thus under the conditions of the test, the tablet of the present invention shows a marked improvement in stability. Whereas the comparative tablet loses substantially all of the available chlorine after three weeks storage under "accelerated" test storage conditions, the tablet of this invention still retains approximately half of the available chlorine under the same accelerated test storage conditions.

Examples 2 and 3 showed percent losses of available chlorine after three weeks storage under "accelerated" conditions of 36% and 39%, respectively.

In Table 1 which follows is given the data on the defoaming properties of Examples 1, 2 and 3, and for comparative purposes the defoaming properties of a tablet made under the same conditions but which differs from Examples 1, 2 and 3 in that the tablet contained no nonionic surfactant; it contained 2.5% white paraffin oil, which amount is equal to the combined amounts of the nonionic surfactant and white paraffin oil in Examples 1 and 2.

TABLE 1

| Tablet Under Test | Foam Height, cm. | | | |
|---|---|---|---|---|
| | Before Storage | | After Storage | |
| | No Milk | Milk Added | No Milk | Milk Added |
| Example 1 | | | 1.8 | 2.7 |
| Example 2 | 0.0 | 0.1 | 0.5 | 2.0 |
| Example 3 | 0.0 | 0.0 | 0.0 | 0.7 |
| Comparative Tablet | 0.0 | 4.3 | 0.4 | 4.6 |

This data shows that the preparations of this invention reduce foaming which takes place upon addition of milk solids by about one-half. Whereas the foam height is 4.6 cm. with the comparative tablet, it is only 2 cm. in the case of Example 2 and 0.7 cm. in the case of Example 3.

Examples 1, 2 and 3 were tested in an automatic dishwasher and were found to give excellent cleansing power both before storage and after storage for three weeks under the "accelerated" storage test conditions above given. The rate of solubility was good.

The percent loss of available chlorine in Examples 4 and 5 was 30% and 35% respectively. The percent loss of available chlorine in a comparative granular preparation which differed from Examples 4 and 5 in the omission of both the nonionic surfactant and the white paraffin oil was 45%, demonstrating that the combination of nonionic surfactant and white paraffin oil results in a decided improvement in the stability of granular preparations.

In Table 2 which follows is given the data obtained in the deforming tests on Examples 4 and 5. For comparative purposes in this table are included two preparations which differ from Examples 4 and 5 in the case of Comparison A in the omission of both the white paraffin oil and the nonionic surfactant, and in the case of Comparison B in the omission of only the nonionic surfactant. Comparison A made in the same manner as Examples 4 and 5 contained 25% anhydrous sodium metasilicate of the same particle size as in Examples 4 and 5, 2.5% sodium dichloroisocyanurate, 42.5% soda ash, and 30% sodium tripolyphosphate. Comparison B contained the same percentages of anhydrous sodium metasilicate, sodium tripolyphosphate and sodium dichloroisocyanurate plus 1.5% white paraffin oil and 41% soda ash. The results are given in Table 2 which follows:

TABLE 2

| Granular Preparation Under Test | Foam Height, cm. | | |
|---|---|---|---|
| | Before Storage | After Storage | |
| | Milk Added | No Milk | Milk Added |
| Example 4 | 0.6 | 0.3 | 1.1 |
| Example 5 | 0.3 | 0.0 | 2.1 |
| Comparison A | 4.8 | 0.0 | 4.6 |
| Comparison B | 4.5 | 0.0 | 4.7 |

Thus Examples 4 and 5 have good defoaming properties. The foam height is reduced before storage from 4.8 or 4.5 to 0.6 and 0.3, respectively, and after storage from 4.6 or 4.7 to 1.1 and 2.1, respectively.

It will be noted that the present invention provides a dishwashing preparation in tablet or free-flowing granular form having low-foaming or nonfoaming properties, good storage stability, good dissolving rate, good cleansing power and which are not corrosive to the metal parts of automatic dishwashers.

Since certain changes can be made in the dishwashing preparations, both in the tablet and granular form, embodying this invention, without departing from the scope of this invention, it is intended that all matter contained in the above description shall be interpreted as illustrative and not in a limiting sense.

What is claimed is:

1. A dishwashing detergent preparation containing essentially from 2% to 5% by weight of a dichloroisocyanurate from the group consisting of sodium and potassium dichloroisocyanurates, from 0.5% to 3% by weight of white paraffin oil, from 0.5% to 3% by weight of a low-foaming nonionic surfactant compatible with chloroisocyanurates and which defoams food soils, from 20% to 40% by weight of a sodium silicate having an $Na_2O$ to $SiO_2$ ratio of 1:3.25 to 2:1 and a water content of 0 to 20%, from 25% to 55% by weight of a polyphosphate from the group consisting of sodium and potassium polyphosphates having an $R_2O$ to $P_2O_5$ ratio of 1:1 to 2:1, wherein R is sodium or potassium, and the rest substantially entirely filler, the preparation when in tablet form containing anhydrous sodium silicate having an average particle size not exceeding 74 microns.

2. A dishwashing detergent preparation in tablet form containing essentially from 2% to 5% by weight of sodium dichloroisocyanurate, from 0.5% to 3% by weight of white paraffin oil, from 0.5% to 3% by weight of a low-foaming nonionic surfactant compatible with chloroisocyanurates and which defoams food soils, from 20% to 40% by weight of a sodium silicate having an $Na_2O$ to $SiO_2$ ratio of 1:3.25 to 2:1 and a water content of 0 to 20%, from 25% to 55% by weight of a polyphosphate from the group consisting of sodium and potassium polyphosphates having an $R_2O$ to $P_2O_5$ ratio of 1:1 to 2:1, wherein R is sodium or potassium from 0.1% to 1% of a tableting binder inert in said preparation, and the rest substantially entirely filler from the group consisting of soda ash, sodium chloride and sodium sulfate.

3. A dishwashing detergent preparation in tablet form containing essentially from 2% to 5% by weight of potassium dichloroisocyanurate, from 0.5% to 3% by weight of white paraffin oil, from 0.5% to 3% by weight of a low-foaming nonionic surfactant compatible with chloroisocyanurates and which defoams food soils, from 20% to 40% by weight of a sodium silicate having an $Na_2O$ to $SiO_2$ ratio of 1:3.25 to 2:1 and a water content of 0 to 20%, from 25% to 55% by weight of a polyphosphate from the group consisting of sodium and potassium polyphosphates having an $R_2O$ to $P_2O_5$ ratio of 1:1 to 2:1, wherein R is sodium or potassium, from 0.1% to 1% of a tableting binder inert in said preparation, and the rest substantially entirely a filler from the group consisting of soda ash, sodium chloride and sodium sulfate.

4. A dishwashing detergent preparation in granular form containing essentially from 2% to 5% by weight of sodium dichloroisocyanurate, from 0.5% to 3% by weight of white paraffin oil, from 0.5% to 3% by weight of a low-foaming nonionic surfactant compatible with chloroisocyanurates and which defoams food soils, from 20% to 40% by weight of a sodium silicate having an $Na_2O$ to $SiO_2$ ratio of 1:3.25 to 2:1 and a water content of 0 to 20%, having an average particle size of from 230 to 2000 microns, from 25% to 55% by weight of a polyphosphate from the group consisting of sodium and potassium polyphosphates having an $R_2O$ to $P_2O_5$ ratio of 1:1 to 2:1, wherein R is sodium or potassium, and the rest substantially entirely a filler from the group consisting of soda ash, sodium chloride and sodium sulfate.

5. A dishwashing detergent preparation in granular form containing essentially from 2% to 5% by weight of potassium dichloroisocyanurate, from 0.5% to 3% by weight of white paraffin oil, from 0.5% to 3% by weight of a low-foaming nonionic surfactant compatible with chloroisocyanurates and which defoams food soils, from 20% to 40% by weight of a sodium silicate having an $Na_2O$ to $SiO_2$ ratio of 1:3.25 to 2:1 and a water content of 0 to 20% having an average particle size of from 230 to 2000 microns, from 25% to 55% by weight of polyphosphate from the group consisting of sodium and potassium polyphosphates having an $R_2O$ to $P_2O_5$ ratio of 1:1 to 2:1, wherein R is sodium or potassium, and the rest substantially entirely a filler from the group consisting of soda ash, sodium chloride and sodium sulfate.

6. A dishwashing detergent preparation in tablet form containing essentially from about 3% to 4% by weight of sodium dichloroisocyanurate, from 1% to 1.5% white paraffin oil, from 1% to 1.5% of a low-foaming nonionic surfactant compatible with chloroisocyanurates and which defoams food soils, from 25% to 30% anhydrous sodium metasilicate, about 50% sodium tripolyphosphate, about 0.5% tableting binder inert in said preparation, and the rest soda ash.

7. A dishwashing detergent preparation in tablet form containing essentially from about 3% to 4% by weight of potassium dichloroisocyanurate, from 1% to 1.5% white paraffin oil, from 1% to 1.5% of a low-foaming nonionic surfactant compatible with chloroisocyanurates and which defoams food soils, from 25% to 30% anhydrous sodium metasilicate, about 50% sodium tripolyphosphate, and about 0.5% tableting binder inert in said preparation and the rest soda ash.

8. A dishwashing detergent preparation in granular form consisting of about 2.5% sodium dichloroisocyanurate, about 1% white paraffin oil, about 1% of a low-foaming nonionic surfactant compatible with chloroisocyanurates and which defoams food soils, about 25% anhydrous sodium metasilicate having an average particle size of from 230 to 2000 microns, about 30% sodium tripolyphosphate, and about 41% soda ash.

9. A dishwashing detergent preparation in granular form consisting of about 2.5% potassium dichloroisocyanurate, about 1% white paraffin oil, about 1% of a low-foaming nonionic surfactant compatible with chloroisocyanurates and which defoams food soils, about 25% anhydrous sodium metasilicate having an average particle size of from 230 to 2000 microns, about 30% sodium tripolyphosphate, and about 41% soda ash.

References Cited

UNITED STATES PATENTS

| | | | |
|---|---|---|---|
| 3,110,677 | 11/1963 | Karabinos et al. | 252—99 |
| 3,128,250 | 4/1964 | Lintner | 252—99 |
| 3,154,494 | 10/1964 | Speak et al. | 252—96 |
| 3,213,029 | 10/1965 | Muchow et al. | 252—99 |
| 3,250,720 | 5/1966 | Moore | 252—187 |
| 3,255,117 | 6/1966 | Knapp et al. | 252—99 |
| 3,257,324 | 6/1966 | Wearn et al. | 252—99 |

FOREIGN PATENTS 955,896 4/1964 Great Britain.

LEON D. ROSDOL, *Primary Examiner.*

M. WEINBLATT, *Assistant Examiner.*